United States Patent [19]

Day et al.

[11] 3,959,555

[45] May 25, 1976

[54] HEAT-SEALABLE MARKING LABELS

[75] Inventors: Ian Harold Day; John Carmichael-Drage, both of London, England

[73] Assignee: Polymark Corporation, Cincinnati, Ohio

[22] Filed: Mar. 6, 1974

[21] Appl. No.: 449,419

Related U.S. Application Data

[62] Division of Ser. No. 71,056, Sept. 10, 1970, abandoned.

[30] Foreign Application Priority Data

Sept. 19, 1969 United Kingdom............... 46301/69

[52] U.S. Cl................................. 428/349; 156/240; 427/152; 428/352; 428/354; 428/914

[51] Int. Cl.²..................... B32B 27/34; B32B 27/30

[58] Field of Search......................... 117/3.4, 122 H; 156/331, 240; 161/406; 260/28 SC; 427/152; 428/349, 352, 354, 914

[56] References Cited

UNITED STATES PATENTS

| | | | |
|---|---|---|---|
| 1,882,593 | 10/1932 | Hentschel | 117/3.4 |
| 2,122,043 | 6/1938 | Pollard | 117/3.5 X |
| 2,558,804 | 7/1951 | Wittgren | 156/240 X |
| 3,031,324 | 4/1962 | Jankowski | 117/3.1 |
| 3,359,127 | 12/1967 | Meyer et al. | 117/3.4 |
| 3,516,842 | 6/1970 | Klinker et al. | 117/3.4 |
| 3,595,739 | 7/1971 | Meyer | 117/122 H |

FOREIGN PATENTS OR APPLICATIONS

| | | | |
|---|---|---|---|
| 954,459 | 4/1964 | United Kingdom | 117/3.1 |

*Primary Examiner*—Harry J. Gwinnell
*Attorney, Agent, or Firm*—John C. Smith, Jr.

[57] ABSTRACT

In producing permanent markings on flexible articles such as textiles the characters or symbols are overlaid by a layer of clear lacquer of the same configuration as the symbols or characters, or slightly larger in all directions. A transfer may be used which is applied under heat and pressure the clear lacquer is bonded to the surface with the character or symbol exposed but also bonded in position. The characters or symbols as well as the clear lacquer are formed from a heat curable resin system capable of rapidly curing in situ on the article to form an inert and insoluble marking.

10 Claims, 3 Drawing Figures

HEAT-SEALABLE MARKING LABELS

This is a division of application Ser. No. 71,056 filed Sept. 10, 1970, now abandoned.

The present invention relates to heat-sealable marking labels for producing permanent decorative or informative markings on textile or other flexible articles and is an improvement in or development of the invention described in U.S. Pat. No. 3,359,127 which refers to the marking of textile products by means of heat transfers. Further resin systems for use with such marking labels are also described in later patents standing in the name of the proprietors of this invention.

Figure 1:
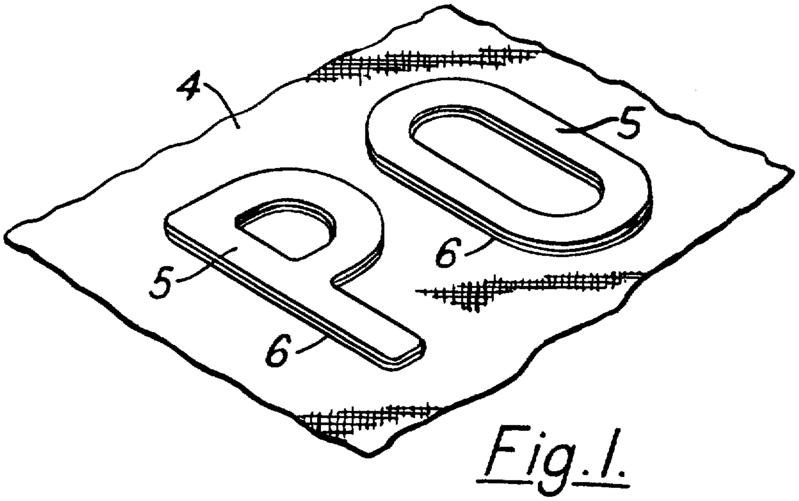
Figure 2:
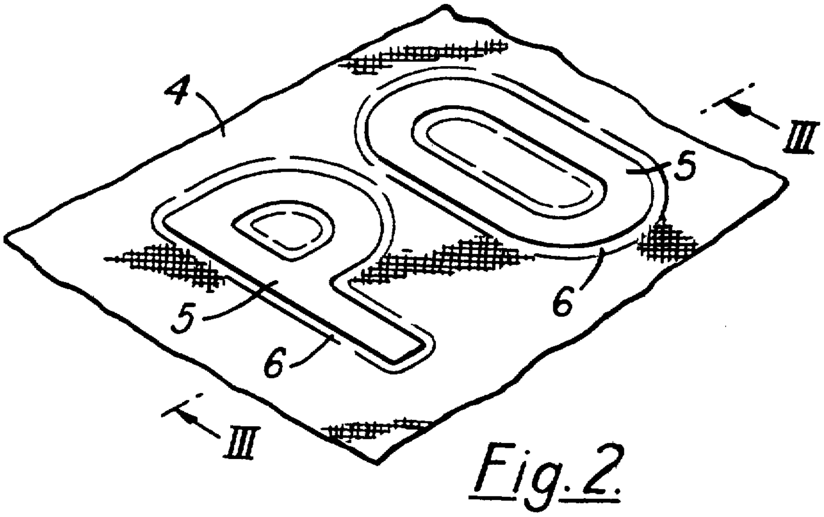

The aforesaid patent includes a construction in which a temporary support receives printed matter, utilising a printing medium containing a soluble linear polyamide which is capable of being cured by the action of heat and pressure during bonding the printed matter to a textile or other surface to form an inert and insoluble permanent marking in situ on the article. In FIGS. 1 and 2 of said patent the printed matter consists of separate and distinct elements without any continuous layer associated with them, thus contrasting with the construction described with reference to FIGS. 3 to 10 where the printed matter is associated with a continuous layer.

In a typical arrangement described in the aforesaid patent a release coated paper, such as a paper laminated to polyester film, is employed as a temporary support and display or information matter is printed on to this temporary support or on a clear layer provided on said support, using inks and clear lacquers made from heat curable resins which, under the influence of heat and pressure fuse into a textile substrate and under acid conditions link to form a decorative or informative marking on the textile, which marking is substantially inert to laundering and cleaning operations to which the textile bearing the marking will subsequently be subjected.

Generally speaking, to obtain satisfactory bonding to a textile surface, the minimum thickness of the resin plus ink present should be in the region of 15 micrometres (dry thickness) which thickness can be achieved in the case of individual printed characters either by using a comparatively coarse screen mesh or by building up the thickness in several layers. A course screen mesh is not always desirable as the quality of the design printing may surface in some cases.

When the transfer consists of individual printed characters the printing ink used must contain sufficient pigment to give a bright and clear marking when transferred to the textile article but the presence of the pigment may adversely affect the ability of the printed character to bond to the article to be marked. Further the total dry thickness which can be produced in a single screen printing operation may not be sufficient to give adequate thickness or body to the individual elements so as to produce a clear, distinct and well-formed marking on the textile article and to ensure adequate resistance to abrasion and cleaning. These difficulties cannot in practice be evaded by applying successive layers of printing ink because although this may give added thickness it is not always easy to ensure that correct register of successive printings is obtained and there is still the difficulty of producing clear and sharp markings while further the pigment-containing ink may not bond satisfactorily to the textile article.

This difficulty does not arise to the same extent where the printed characters are associated with continuous layers as described with reference to FIGS. 3 to 10 of the aforesaid patent since the additional layers will normally consist of clear lacquer which bond satisfactorily to the article, provide further body and thickness, and ensure that the printed characters are clear and distinct and of good appearance. There are however certain disadvantages associated with the use of continuous layers, in particular in the case of a relatively thin textile article the continuous layers tend to give a certain measure of stiffness over the label area.

In general the present invention is concerned with the application of distinct informative characters by means of a heat transfer process, the said characters being textual or of a decorative character; they may include for example Trade Mark of makers' name labels for textile articles or "care" labels containing information as to the cleaning or laundering treatments to which the article should be subjected, and all such forms of label markings are hereinafter comprehended within the expression "printed characters".

An important feature of the present invention which is common to the methods and articles described in the aforesaid patents is that, due to the nature of the resin systems employed and to their use under acid conditions, for example in the presence of a weak organic acid or a substance yielding such an acid, it is possible to produce heat transfers or labels having a long shelf life. Accordingly such transfers or labels may be held in stock by a manufacturer of textile articles ready for use as and when required, but nevertheless the step of bonding such transfers or labels to a textile article can be effected by a hot pressing cycle of only a few seconds.

The object of the present invention is to provide methods of marking textile or other articles which comprise the advantage of distinct printed characters but without the need for continuous layers, and in its broadest aspect the present invention comprises a method of producing permanent markings on flexible articles comprising applying to the article under heat and pressure a marking element or transfer consisting of distinct characters incorporating a heat curable resin system and a pigment, the heat and pressure serving to bond the characters to the surface of the article to be marked and to effect curing of the resin, in which the characters are each covered individually with a layer of a clear heat curable resin system to provide additional substance and body for each character without providing a continuous layer over the whole area of the permanent markings. These methods involve printing, preferably by screen printing, the design directly on to the temporary support followed by printing a layer of resin in such a way that only the individual design symbols or characters, or areas slightly larger in all directions than the symbols or characters are covered by the resin. In general the resin is a clear colourless lacquer but it may in some cases be coloured or pigmented. These arrangements offer a number of advantages over the previous methods, particularly in conditions where a background layer for the symbols or characters is not required:

1. Substantial economies of materials are achieved,

2. Fine detail of the design can be reproduced while at the same time a substantial quantity of unpigmented resin can be present at the design areas, 3. The fabric remains very flexible as there is no continuous layer of resin applied to it, 4. An aesthetically pleasing marking results.

Heat transfers according to the present invention can be prepared according to the following examples which serve to illustrate, not to limit, the invention.

EXAMPLE I

Formulation 1

A black ink is prepared from the following ingredients, all parts being by weight:

15 parts of methoxymethyl nylon ("Calaton CB" from I.C.I. Ltd), 60 parts diacetone alcohol, 20 parts water, 5 parts carbon black, 0.3 part citric acid.

Formulation 2

A lacquer is prepared using:

25 parts methoxy methylated nylon ("Nylon resin 829" from B.C.I. of New York), 64 parts n-Butanol, 11 parts water, 0.5 part citric acid.

Formulation 3

A red-colour printing ink is prepared from:

15 parts copolyamide resin ("Technyl Z15901" from Rhodiaceta of France), 30 parts diacetone alcohol, 30 parts n-Butanol, 15 parts water, 5 parts of cross-linking agent (melamine precondensate containing methoxymethyl groups also obtainable from Rhodiaceta of France), 1 part citric acid, 10 parts cadmium red.

Formulation 4

A clear lacquer is prepared from:

20 parts copolyamide resin ("Technyl Z15901" from Rhodiaceta of France), 65 parts n-Butanol, 15 parts water, 6 parts of cross-linking agent (melamine precondensate containing methoxy methyl groups also obtainable from Rhodiaceta), 1 part citric acid.

Formulation 5

A blue-colour printing ink is prepared from:

100 parts acrylic resin as an aqueous emulsion containing 2% of carboxy groups, 5 parts of hexamethoxymethyl melamine, 0.2 part citric acid, 2 parts acrylic thickening agent, 10 parts phthalocyanine blue paste (30% in polyethylene glycol).

This composition is adjusted to a pH of 7 with ammonia.

Formulation 6

A clear lacquer is prepared from:

100 parts acrylic resin as an aqueous emulsion, containing 2% of carboxy groups, 5 parts hexamethoxymethyl malamine, 0.2 part citric acid, 2 parts acrylic thickening agent.

In the preparation of a heat transfer a design 8 micrometres in dried thickness is printed in reverse by a screen method on a laminate of paper and polyester film using one or more of the printing ink formulations. Using the same screen a lacquer solution is printed to superimpose as closely as possible on to the design. 10 micrometres are achieved in this case giving the corresponding total transfer thickness of 18 micrometres. Using a press set at 200°C, 8 seconds and 4 Kg per sq. cm, these transfers can be applied on to smooth textile fabrics, including rayon linings, cotton, cotton/polyester and nylon shirtings, and offer an attractive appearance after at least ten dry cleanings or mild washes.

Much greater resistance and the possibility of application on to rough fabrics such as cotton drill can be achieved by increasing the total thickness by a further coat of the lacquer solution. A total label thickness of 30 micrometres may then be obtained which has an attractive appearance effective through about fifty severe laundering processes.

EXAMPLE II

A screen having 50 threads per linear centimetre has a stencil bearing a repetitive design applied to it by the method common to the screen printing industry.

Using inks of formulations 3 or 5 the design is printed on to a temporary support such as laminate of polyester film and paper, printing machine conditions being adjusted to give an average design thickness of 10 micrometres, after drying.

Using clear and unpigmented lacquer formulations 4 or 6 a further print is superimposed on to the first, to give a total dry thickness of about 20 micrometres. The printed sheets are then cut into individual transfer labels.

The transfers may be heat sealed to textile fabrics such as cotton shirting (easy-care resin finished), warp-knit nylon, or rayon satin, using a heat and pressure sealing machine set at 200°C., 8 seconds and 2 $Kg/cm^2$. After removal of the temporary support the labelled fabrics were highly flexible and the transferred print had a "sharp" appearance, considerably more legible than a woven or printed fabric label.

The applied labels showed good resistance to repeated laundering, dry cleaning, ironing and pressing.

EXAMPLE III

The printed sheets of Example II were printed once more using the same clear and unpigmented formulations as before, to give a total dry thickness of about 30 micrometres, and cut into individual transfers.

The transfer machine was adjusted to 200°C., 8 seconds, 4 $Kg/cm^2$. The labels were applied on to cotton drill overalls, cotton jersey, sports-wear, cotton denim, nylon overalls and showed fine print detail as well as excellent resistance to repeated, vigorous laundering.

EXAMPLE IV

Formulation 7

An aluminum-pigmented ink is prepared from:

15 parts methoxymethyl nylon ("Nylon resin 829" from BCI of New York), 60 parts diacetone alcohol, 20 parts water, 6 parts aluminum powder (fine lining quality)

0.4 part citric acid,

A screen having 70 threads/linear centimetre has a stencil applied to it, bearing a repetitive design. A second screen having 40 threads/linear centimetre has a similar stencil applied to it in such a way that all details are increased in size by 0.2 millimeter in each direction, while the centre of each detail remains in the same position. This is done photographically by interposing a thick sheet of polyester film between the positive and the stencil, thus scattering the light.

Formulation 7 is printed through the "70" screen, the dry thickness achieved being about 5 micrometres.

Formulation 2 is then printed through the "40" screen, in register so that the unpigmented print just overlaps the design in all directions. The total thickness is about 20 micrometres.

After transfer as in Example II ver high print quality was apparent and the laundry and dry cleaning resistance was still good.

The above examples are based on formulations including solubilised polyamides, soluble copolyamides and acrylic resins, the latter being available in the form of aqueous emulsions but there are a number of other cross-linking resin systems which provide the required properties. A further example is a terpolymer consisting of a major proportion of butyl acrylate, a smaller proportion of acrylonitrile and a very small proportion of acrylic acid, a typical resin comprising for example 55% butyl acrylate, 44% acrylonitrile and 1% acrylic acid. An ink formulation using such a resin is as follows:

Formulation 8

| | | | |
|---|---|---|---|
| 1. | Acrylic latex containing 45% of a 55/44/1 acrylic resin as specified above | 100 | parts |
| 2. | Dibutyl phthalate as a 50% aqueous emulsion | 5 | parts |
| 3. | Hydroxy ethyl cellulose | 2 | parts |
| 4. | Aluminium powder | 5 | parts |
| 5. | Cross-linking agent such as hexamethoxymethyl melamine | 5 | parts |
| 6. | Citric acid | 0.5 | part |
| 7. | 50% ammonia | 1 | part |

The ingredients 2, 3, 4 and 5 are thoroughly dispersed before addition to the latex.

A similar formulation may be used as a clear lacquer, the aluminum powder being omitted.

In all the above examples the inks, clear lacquer solutions and dispersions may be replaced by other formulations such as are described in the specifications referred to above.

Figure 3:
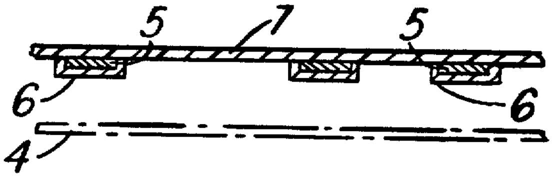

The features of the present invention are illustrated on the accompanying drawings in which:

FIG. 1 illustrates a marked textile article showing part of a marking bonded to the textile article in which the clear lacquer layer is substantially coincident with each of the symbols, FIG. 2 is a view simillar to FIG. 1 showing part of a marking bonded to the textile article in which the clear lacquer layer is slightly larger than each respective symbol, and FIG. 3 is a cross-section showing a heat transfer prior to application to the textile article and representing a cross-section of the portion of the transfer corresponding to the line III—III in FIG. 2.

As shown in FIG. 1 a textile article 4 has been provided with a marking consisting of letters, symbols, devices or the like represented by the symbols 5 which are supported directly on the textile article 4, each symbol being separate and distinct and without a continuous lacquer layer over the whole area of the marking. Each symbol 5 is produced by means of a heat transfer, as described in Example I, and thus consists of an underlying layer of clear lacquer with the printed symbol marking on the exposed surface of the transferred marking.

In the embodiment shown in FIG. 2 the transfer was prepared in accordance with Examples II, III or IV, and it will be seen that the clear lacquer 6 extends slightly beyond the boundaries of the symbols 5.

FIG. 3 shows a suitable heat transfer for use in producing the result shown in FIG. 2. A temporary support 7 as specified in the foregoing examples incorporates the printed symbol areas 5 and printed areas 6 of clear lacquer which are superimposed on the symbol markings and are of slightly greater dimensions so as to extend over the boundaries of the symbol markings. When such a heat transfer is bonded to a textile article under heat and pressure the clear lacquer layers 6 form an underlying layer in contact with the textile article with the symbol markings 5 exposed on the upper face, the temporary support 7 being removed after bonding has been effected.

We claim:

1. A heat transfer for permanently marking flexible textile products comprising a temporary support having release properties, a plurality of individual marking characters printed on said temporary support, a coating of clear heat-curable resin superimposed on each of said marking characters individually, said coating being substantially coextensive with the edges of each of said marking characters, the printing medium of said marking characters and the clear layer each comprising a theremoplastic cross-linking resin system capable of being cured by heat and pressure to form an inert and wear-resistant marking on the surface of the article to be marked and said printing medium including a pigment.

2. A heat transfer according to claim 1, wherein the resin system consists of a soluble polyamide or an acrylic resin, and a cross-linking agent containing alkoxy alkyl groups.

3. A heat transfer according to claim 2, wherein the resin system consists of a methoxy methylated nylon, a weak organic acid curing agent and said cross-linking agent containing alkoxy alkyl groups.

4. A heat transfer according to claim 2, wherein the resin system consists of a soluble copolyamide, a weak organic acid curing agent and a cross-linking agent containing methoxy methyl groups.

5. A heat transfer according to claim 4, wherein the resin system comprises an acrylic resin in the form of a solution or dispersion, a weak organic acid or acid-yielding compound and a cross-linking agent.

6. A heat traansfer for permanently marking flexible textile articles comprising:

a. a temporary support having release properties, b. an informative or decorative marking printed on said temporary support, said marking comprising a plurality of individual characters, c. a separate clear layer coating on each of said individual characters, each said coating being substantially coextensive with the edges of each of said characters and not forming a continuous layer over the entire area of said marking, d. the printing medium of said informative or decorative marking and said clear layer each comprising a thermoplastic cross-linking resin system capable of being cured by heat and pressure to form an inert and wear-resistant marking on the surface of the article to be marked and said printing medium including a pigment, e. said cross-linking resin system having a long storage life at ambient temperature and under the influence of heat and pressure, said system being capable of bonding to a textile article and, during said bonding, cross-linking rapidly in situ to a wash, dry-clean and wear-resistant form.

7. A heat transfer according to claim 6 wherein the resin system comprises a soluble polyamide or an acrylic resin, and a cross-linking agent containing alkoxy alkyl groups.

8. A heat transfer according to claim 7, wherein the resin system consists of a methoxy methylated nylon, a weak organic acid curing agent and said cross-linking agent containing alkoxy alkyl groups.

9. A heat transfer according to claim 7, wherein the resin system consists of a soluble copolyamide, a weak organic acid curing agent and a cross-linking agent containing methoxy methyl groups.

10. A heat transfer according to claim 9, wherein the resin system comprises an acrylic resin in the form of a solution or dispersion, a weak organic acid or acid-yielding compound and a cross-linking agent.

* * * * *